(12) United States Patent
Günther et al.

(10) Patent No.: US 11,890,733 B2
(45) Date of Patent: Feb. 6, 2024

(54) COMPRESSION JAW ASSEMBLY UNIT (71) Applicant: Purem GmbH, Neunkirchen (DE)

(72) Inventors: Max Günther, Dresden (DE); Karsten Rudolph, Dresden (DE); Thomas Zschippang, Coswig (DE); Sebastian Peter, Freiberg (DE)

(73) Assignee: PUREM GMBH, Neunkirchen (DE)

( * ) Notice: Subject to any disclaimer, the term of this patent is extended or adjusted under 35 U.S.C. 154(b) by 930 days.

(21) Appl. No.: 16/807,687

(22) Filed: Mar. 3, 2020

(65) Prior Publication Data

US 2020/0282522 A1    Sep. 10, 2020

(30) Foreign Application Priority Data

Mar. 4, 2019   (DE) ...................... 10 2019 105 322.6

(51) Int. Cl.
*B25B 5/16*    (2006.01)
*B25B 5/14*    (2006.01)

(52) U.S. Cl.
CPC .............. *B25B 5/163* (2013.01); *B25B 5/147* (2013.01)

(58) Field of Classification Search
CPC .......... F16B 21/06; B25B 5/147; B25B 5/163
See application file for complete search history.

(56) References Cited

U.S. PATENT DOCUMENTS

| 4,492,015 | A | * | 1/1985 | Dearman | B23K 9/0286 269/43 |
| 4,667,386 | A | | 5/1987 | Enomoto et al. | |
| 6,058,755 | A | * | 5/2000 | Viegener | B25B 27/10 72/402 |
| 6,371,468 | B1 | * | 4/2002 | Lessard | B25B 5/147 269/238 |
| 6,405,437 | B1 | | 6/2002 | Sussmilch et al. | |

(Continued)

FOREIGN PATENT DOCUMENTS

DE    100 18 804 A1    10/2001
DE    60205738 T2    7/2006

(Continued)

*Primary Examiner* — Seahee Hong
(74) *Attorney, Agent, or Firm* — McGlew and Tuttle, P.C.

(57) ABSTRACT

A compression jaw assembly unit for a compressing device for compressing tubular metal parts includes a compression jaw carrier (17) and a compression jaw (16), provided at the compression jaw carrier (17), with a compressing surface (18) that is oriented essentially facing away from the compression jaw carrier (17) and is curved transversely to a compression jaw longitudinal direction ($L_B$) in a compression jaw transverse direction ($Q_B$). The compression jaw (16) includes a fixed compression jaw segment (22), which is fixed to the compression jaw carrier (17) and provides a compressing surface segment (24), and at least one movable compression jaw segment (26, 28) providing a compressing surface segment (30, 32). The at least one movable compressing surface segment (26, 28) can be moved in a direction of movement (B) in relation to the fixed compressing surface segment (22) against the prestressing action of a prestressing device (42).

20 Claims, 2 Drawing Sheets (56) References Cited

U.S. PATENT DOCUMENTS

| | | | | |
|---|---|---|---|---|
| 6,634,202 | B1* | 10/2003 | Oetiker | B25B 27/10 29/243.517 |
| 8,777,199 | B2* | 7/2014 | Webb | E21B 19/161 269/25 |
| 10,837,645 | B2* | 11/2020 | Merlau | B25B 5/147 |
| 10,907,756 | B2* | 2/2021 | Anderson | F16L 3/1222 |
| 2012/0096700 | A1* | 4/2012 | Patterson | F16B 7/0493 403/374.2 |
| 2020/0254589 | A1* | 8/2020 | Roberts | B25B 27/16 |
| 2021/0108662 | A1* | 4/2021 | Huang | F16B 2/185 |

FOREIGN PATENT DOCUMENTS

| | | |
|---|---|---|
| JP | H03 81517 A | 4/1991 |
| JP | 2003286836 A | 10/2003 |
| JP | 2008298019 A | 12/2008 |

\* cited by examiner

Fig. 2

COMPRESSION JAW ASSEMBLY UNIT

CROSS REFERENCE TO RELATED APPLICATIONS

This application claims the benefit of priority under 35 U.S.C. § 119 of German Application No. 10 2019 105 322.6, filed Mar. 4, 2019, the entire contents of which are incorporated herein by reference.

TECHNICAL FIELD

The present invention pertains to a compression jaw assembly unit, which can be used in a compressing device for compressing tubular metal parts.

TECHNICAL BACKGROUND

In the manufacture of exhaust gas treatment devices, for example, catalytic converter devices or particle filters, to be integrated into exhaust systems of internal combustion engines, exhaust gas treatment units, which generally have a monolithic configuration and are coated, for example, with catalytically active material, are wrapped around with mounting mats made of fibrous material and inserted into housings that have a tubular, i.e., an essentially cylindrical configuration and are made of metallic material or sheet metal material. A defined positioning of the exhaust gas treatment units in the housings receiving same is achieved by the resulting compression of the mounting mats. This compression of the mounting mats may be further enhanced, for example, after the positioning of the exhaust gas treatment units wrapped around with the mounting mats in the housings receiving same by these housings being compressed from the outside. Such housings may also be deformed by radial compression before the insertion of the exhaust gas treatment units and by being brought with high precision to a desired dimension or into a desired shape to be provided for receiving the exhaust gas treatment units.

To generate this deformation by radial compression, the housings are clamped in compressing devices, which are composed of a plurality of compression jaw assembly units. The compression jaw assembly units, which are arranged following one another about the outer circumference of a clamped housing in the circumferential direction, are moved radially inwards to compress the housing and thus press onto the housing from the outside and hereby deform same in the radial direction. In order to make possible such a movement of the compression jaw assembly units radially inwards, it is necessary that there be a circumferential spacing between the individual compression jaw assembly units at least in a starting state before the movement radially inwards, so that compression jaw assembly units adjacent to one another in the circumferential direction do not block one another during the movement radially inwards.

This circumferential spacing present between the compression jaw assembly units runs the risk that folds, interfering contours or shape deviations in the thus treated housings occur in case of the radial loading of, e.g., housings made of sheet metal material in the area of these circumferential spacings. The risk of such undesired effects in case of the radial loading of the housings can be reduced by comparatively thick material of which this housing is made being used for this housing, which also leads to increased manufacturing costs, in consideration of the fact that such thick material of which this housing is made is not necessary per se for the operation and the operability of the exhaust gas treatment units made with it.

SUMMARY

An object of the present invention is to provide a compression jaw assembly unit for a compressing device for compressing tubular metal parts, especially for exhaust systems of internal combustion engines, and a compressing device composed of a plurality of such compression jaw assembly units, which make possible a precise compressing deformation of tubular metal parts with reduced risk of generating undesired deformations.

This object is accomplished according to the present invention by a compression jaw assembly unit for a compressing device for compressing tubular metal parts, comprising:
- a compression jaw carrier,
- at least one compression jaw, which is provided at the compression jaw carrier with a compressing surface, is oriented essentially facing away from the compression jaw carrier and is curved transversely to a compression jaw longitudinal direction in a compression jaw transverse direction.

The compression jaw comprises a fixed compression jaw segment which is fixed to the compression jaw carrier and provides a compressing surface segment and at least one movable compression jaw segment providing a compressing surface segment, wherein the at least one movable compressing surface segment can be moved in a direction of movement in relation to the fixed compressing surface segment against the prestressing action (biasing action) of a prestressing device (biasing device).

Due to the provision of the compression jaw with a plurality of compression jaw segments that can be moved in relation to one another, the circumferential spacing necessary for making possible a radial movement of the compression jaw assembly units for compressing a tubular metal housing are not only split into partial circumferential spacings which are to be provided between individual compression jaw assembly units, but a part of this overall necessary circumferential spacing is kept in reserve in the individual compression jaw assembly units between the compression jaw segments that are movable in relation to one another. This leads to the formation of a greater number of partial circumferential spacings, each of which has smaller dimensions, distributed over the entire circumference. The risk that undesired deformations result due to a yielding movement of the metal housing to be deformed in case of the radial loading of a tubular metal housing in the area of such comparatively small partial circumferential spacings, i.e., in areas, in which the metal housing is at first not acted on by areas of the compression jaws during radial loading, is thus markedly reduced. This makes it possible, for example, in case of the manufacture of exhaust gas treatment devices, for example, of catalytic converter devices or particle filters, to use tubular metal housings having markedly lower wall thickness, which leads to reduced manufacturing costs and especially also to a lower weight. The use of compression jaw assembly units configured according to the present invention also makes it possible to process tubular metal parts having more complex circumferential structures which deviate from a circular geometry, for example, oval or elliptical housings, because of the movability of the compression jaw segments in relation to one another.

In order to support a defined distribution of the abovementioned partial circumferential spacings in the circumferential direction about a tubular metal part to be compressed, it is proposed that the fixed compression jaw segment and the at least one movable compression jaw segment be arranged following one another in the compression jaw transverse direction.

For an essentially symmetrical mode of action in the circumferential direction during the radial displacement of a compression jaw assembly unit, provisions may especially be made in this connection for at least one movable compression jaw segment to be arranged on each side of the fixed compression jaw segment in the compression jaw transverse direction.

When the at least one movable compression jaw segment is prestressed by the prestressing device in the direction of movement away from the fixed compression jaw segment, it is ensured that the compression jaw segments can be brought close to one another during the displacement radially inwards.

To achieve a defined prestressing interaction between the different compression jaw segments, the prestressing device may comprise, associated with each movable compression jaw segment, at least one prestressing element (biasing element) acting on this movable compression jaw segment in the direction away from the fixed compression jaw segment.

For this purpose, provisions may be made for at least one prestressing element, which is supported at the fixed compression jaw segment and at the at least one adjacent movable compression jaw segment, to be provided between the fixed compression jaw segment and at least one movable compression jaw segment, preferably each movable compression jaw segment adjacent to this fixed compressing segment in the compression jaw transverse direction.

Defined positioning or holding of the prestressing elements between the compression jaw segments acted on by these prestressing elements can be achieved, for example, by a prestressing element mounting recess elongated in the compression jaw longitudinal direction and partly receiving the at least one prestressing element, which is supported at the fixed compression jaw segment and at the at least one adjacent movable compression jaw segment, being provided in the fixed compression jaw segment or/and in the at least one adjacent movable compression jaw segment.

In order to achieve a defined movement of the compression jaw segments in relation to one another, it is proposed that a compression jaw segment guide formation, which guides the at least one movable compression jaw segment for movement in relation to the fixed compression jaw segment in the direction of movement, be associated with the at least one movable compression jaw segment.

A reliable guide function can be guaranteed for a configuration which can be embodied in a simple manner, for example, by the guide formation comprising at least one guide element that is carried on the fixed compression jaw segment extending essentially in the direction of movement and a guide opening, which movably receives this guide element in the direction of movement, in the at least one movable compression jaw segment associated with the at least one guide element, or/and by the guide formation comprising a support surface, which supports the at least one movable compression jaw segment on its rear side facing away from the compressing surface. Provisions may especially be made here for the guide formation to comprise at least two guide elements, which are arranged at spaced locations from one another in the compression jaw longitudinal direction or/and in a compression jaw radial direction at right angles to the compression jaw transverse direction and to the compression jaw longitudinal direction.

The compression jaw carrier may comprise a carrier plate, on which the fixed compression jaw segment is carried in a fixed manner.

An action characteristic of the compression jaw assembly unit, which action characteristic is uniform in the circumferential direction, can be supported by the compression jaw having an essentially mirror-symmetrical configuration in respect to the configuration of the compression jaw segments in relation to a compression jaw central plane, which is at right angles to the compression jaw transverse direction.

It is advantageous when the compressing surface is not curved in the compression jaw longitudinal direction especially when tubular metal parts with an essentially cylindrical circumferential contour, i.e., a cross-sectional dimension or cross-sectional geometry that is essentially unchanged in a longitudinal direction of such metal parts, shall be compressed with a compression jaw assembly unit configured according to the present invention.

In order to bring about a displacement of the compression jaw segments in relation to one another in a defined manner during a radial movement of a compression jaw assembly unit for compressing a tubular metal part, it is proposed that at least one movable compression jaw segment, preferably each movable compression jaw segment have on its side facing away from the fixed compression jaw segment in the compression jaw transverse direction a support surface, extending essentially radially in relation to a center of curvature of the compressing surface and extending in the compression jaw longitudinal direction, for supporting a compression jaw of an adjacent compression jaw assembly unit at a movable compression jaw segment. In the course of the radial movement, movable compression jaw segments directly adjacent to one another of compression jaw assembly units that are directly adjacent to one another can come into contact with one another with their support surfaces which are located opposite one another. If this state is reached, a continuing radial movement of the compression jaw assembly units leads to the movable compression jaw segments being forced towards the respective associated fixed compression jaw segment essentially in the circumferential direction or tangentially to a circumferential direction.

The present invention further pertains to a compressing device for compressing tubular metal parts, especially for an exhaust system of an internal combustion engine, comprising a plurality of compression jaw assembly units configured according to the present invention, which are arranged following one another in the circumferential direction about a compressing device longitudinal axis and are movable essentially radially in relation to the compressing device longitudinal axis.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
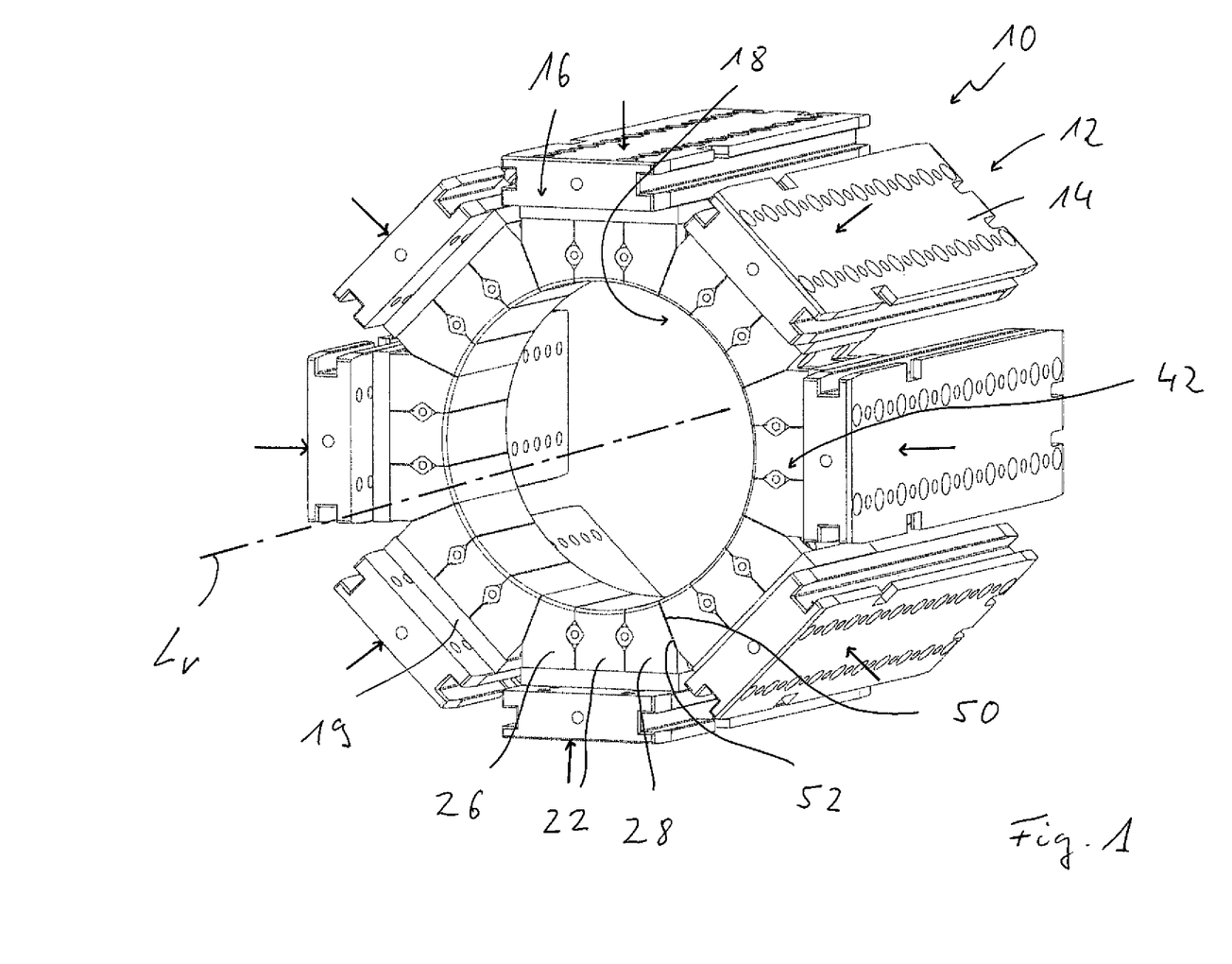
FIG. 1 is a perspective view showing a compressing device for compressing tubular metal parts with a plurality of compression jaw assembly units in a perspective view.

Referring to the drawings, FIG. 1 shows in a perspective view an essential system area of a compressing device 10, with which tubular metal parts can be compressed by radial action. Such tubular metal parts may be tubular housings made, for example, of sheet metal material, in which exhaust gas treatment units, e.g., catalytic converter units or partial filters, can be accommodated. Due to radial compression of such housings, these housings can be brought to a desired dimension that is suitable for accommodating exhaust gas treatment units, or a holding action generated by radial compression can be increased for such exhaust gas treatment units.

The compressing device comprises eight compression jaw assembly units 12, which are arranged following one another in the circumferential direction and are preferably structurally identical to one another, in the exemplary embodiment shown in FIG. 1. Each of the compression jaw assembly units 12 comprises a plate-like carrier 14 with a compression jaw 16 carried on it. Each compression jaw 16 provides on its side oriented radially inwards a compressing surface 18, with which a tubular metal part to be compressed is acted on during the radially inwards displacement of a respective compression jaw assembly unit 12. For this radial displacement, the carriers 14 of the compression jaw assembly units 12 may be fixed to a movement mechanism, not shown in the figures, by means of which the compression jaw assembly units 12 can be displaced essentially radially in relation to the compressing device longitudinal axis $L_V$ in a defined and coordinated manner.

Figure 2:
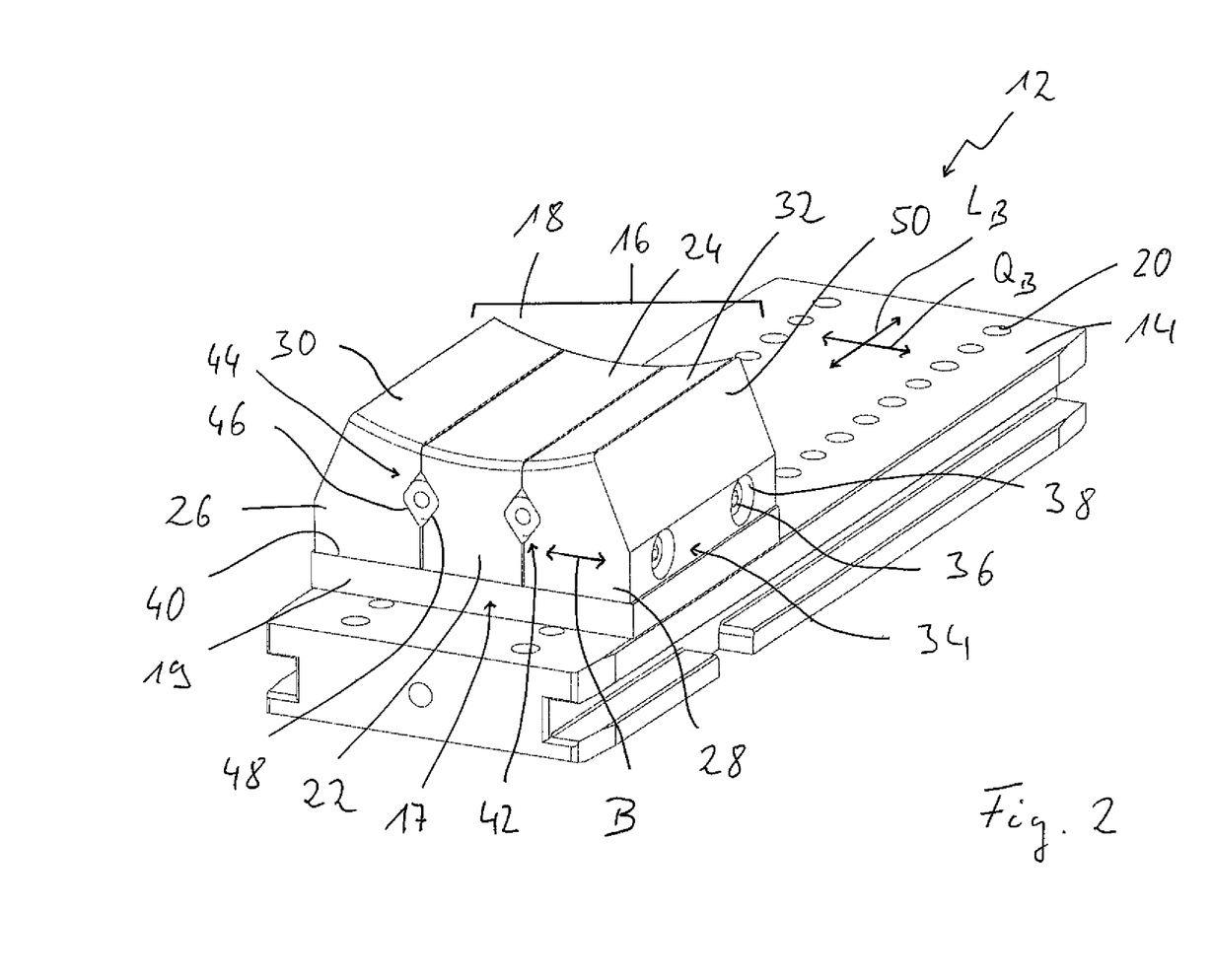
FIG. 2 is a perspective view showing a compression jaw assembly unit in a perspective view.

FIG. 2 shows in detail the configuration of such a compression jaw assembly unit 12. A plurality of fastening openings, through which fastening elements, for example, bolts, can be passed for the fixing of the associated compression jaw 16 or a carrier plate 19 of same essentially providing a compression jaw carrier 17, are provided on each carrier 14. In this connection, such fastening elements can be screwed, for example, into the carrier plate 19 and fix this carrier plate 19 at the selected positioning in the direction of the compressing device longitudinal axis $L_V$.

The compression jaw 16 comprises a fixed compression jaw segment 22 fixed to the carrier plate 19. The fixed compression jaw segment 22 can be fixed to the carrier plate 19, for example, by fastening elements, i.e., for example, bolts, but could also be made integral with the carrier plate 19, i.e., as a block of material. The fixed compression jaw segment 22 provides on its side oriented radially inwards in the compressing device 10 a compressing surface segment 24 of the compressing surface 18 of the compression jaw 16. It can be seen here in the figures that the compressing surface 18 is not curved in a compression jaw longitudinal direction $L_B$, which essentially also corresponds to the direction of extension of the compressing device longitudinal axis $L_V$. This means that each section line between a plane containing the compression jaw longitudinal direction $L_B$ with the compressing surface 18 has an uncurved course. The compressing surface 18 is, however, curved in a compression jaw transverse direction $Q_B$, i.e., essentially at right angles to the compression jaw longitudinal direction $L_B$. This means that the section line of each plane containing the compression jaw transverse direction $Q_B$ with the compressing surface has a curved course. It should be pointed out that this obviously requires that such planes intersecting the compressing surface 18 must actually also have a section line with the compressing surface 18, so that such a plane cannot contain the compression jaw longitudinal direction $L_B$ and the compression jaw transverse direction $Q_B$ at the same time.

The compression jaw 16 further comprises on both sides of the fixed compression jaw segment 22 a movable compression jaw segment 26, 28 each, so that a sequence of the movable compression jaw segment 26, the fixed compression jaw segment 22 and the movable compression jaw segment 28 is obtained in the compression jaw transverse direction $Q_B$. Each movable compression jaw segment 26, 28 can be moved in a direction of movement B in relation to the fixed compression jaw segment 22, wherein this direction of movement B preferably corresponds to the compression jaw transverse direction $Q_B$ and essentially to a tangential direction in relation to the compressing device longitudinal axis $L_V$.

Each movable compression jaw segment 26, 28 has a compressing surface segment 30, 32 on its side oriented radially inwards, so that the compressing surface segments 24, 30, 32 in their entirety provide the compressing surface 18 of the compression jaw 16, which compressing surface 18 is curved in the compression jaw transverse direction $Q_B$. For example, the curvature may be such that the compressing surface 18 thus provided is curved in a circular manner with an essentially constant radius of curvature when compression jaw segments 26, 22, 28 are positioned directly adjacent to one another, so that each compressing surface segment 24, 30, 32 is also curved in a circular manner with a radius of curvature that is essentially constant, especially identical to one another, in case of such a configuration. Regardless of the curvature geometry of the individual compressing surface segments 24, 30, 32, the compressing surface 18 provided by these surface segments 24, 30, 32 can be mirror-symmetrical to a plane of symmetry containing the compressing device longitudinal axis L and intersecting the fixed compression jaw segment 22 centrally.

A guide formation generally designated by 34, associated with each of the movable compression jaw segments 26, 28, is provided to achieve a defined movement of the movable compression jaw segments 26, 28 in relation to the fixed compression jaw segment 22. The guide formation 34 comprises, as can be seen, for example, in connection with the movable compression jaw segment 28, two bolt-like or rod-like guide elements 36, which are arranged at spaced locations from one another in the compression jaw longitudinal direction $L_B$, as well as a guide opening 38 receiving each of these guide elements 36. For example, these guide elements 36 can be provided by guide bolts, which extend from the fixed compression jaw segment 22 essentially in the compression jaw transverse direction $Q_B$ or in the direction of movement B, are fixed to the fixed compression jaw segment 22, for example, by thread meshing or/and pressing in or/and connection in substance, and which overlap corresponding step-like expansions of the guide openings 38 with bolt heads that are expanded radially and thus also provide a movement stop for the respective movable compression jaw segment 26 or 28 in the direction away from the fixed compression jaw segment 22.

The guide formation 34 provided associated with each of the movable compression jaw segments 26, 28 further comprises a guide surface 40 at the carrier plate 19. On this guide surface 40, the respective movable compression jaw segment 26, 28 can be supported with its rear side facing away from the compressing surface 18, especially when a tubular metal part shall be compressed by radial action, so that the guide elements 36 have essentially the function of guiding a respective movable compression jaw segment 26, 28 in the direction of movement B; however, these guide elements 36 essentially do not have to absorb forces oriented at right angles to the direction of movement B during the carrying out of a compressing operation.

A prestressing device (biasing device) 42, prestressing (biases) the respective movable compression jaw segment 26, 28 in the direction of movement B away from the fixed compression jaw segment 22, acts between each of the movable compression jaw segments 26, 28 and the fixed compression jaw segment 22. The respective prestressing device 42 comprises at least one prestressing element (biasing element) 44, which is elongated in the compression jaw longitudinal direction $L_B$, e.g., a radially compressible, tubular or rod-like spring element made of elastomer material, e.g., PU material, or the like. For example, the length of extension of such a prestressing element 44 may correspond essentially to the length of extension of the compression jaw segments 22, 26, 28 prestressed by this prestressing element 44 in relation to one another as well. Such a prestressing element 44 may also be split into a plurality of segments provided separated from one another.

A prestressing element mounting recess 46 or 48 is formed in the fixed compression jaw segment 22 or in the respective movable compression jaw segment 26, 28 in association with each such elongated prestressing element 44. The associated prestressing element 44 meshes with each of these prestressing element mounting recesses 46, 48, so that a defined positioning of the prestressing element 44 is provided in relation to the two compression jaw segments 22, 26, 28 acted on by this prestressing element 44. The prestressing element mounting recesses 46, 48 may also be configured as extending over the entire length of the compression jaw segments 22, 26, 28.

The two movable compression jaw segments 26, 28 are prestressed by the prestressing devices 42 and the prestressing elements 44 thereof in the direction of movement B in the direction away from the fixed compression jaw segment 22 and thus also in the direction away from one another, so that they assume, in principle, i.e., without the effect of external force, a state of maximum spacing from the fixed compression jaw segment 22 in the direction of movement B or in the compression jaw transverse direction $Q_B$. As was already mentioned above, this positioning can be predefined by the guide elements 36 preventing the movable compression jaw segments 26, 28 from any further movement in the direction of movement B in the direction away from the fixed compression jaw segment 22. Other movement stops, for example, at the carrier plate 19, may also predefine this positioning of the movable compression jaw segments 26, 28.

Each movable compression jaw segment 26, 28 has, furthermore, a support surface 50. The support surface 50 is essentially oriented such that it is oriented radially in relation to the compressing device longitudinal axis L, wherein this orientation can be achieved, for example, when a movable compression jaw segment 26 or 28 providing a respective support surface 50 is displaced towards the fixed compression jaw segment 22 to the maximum extent or is supported on it in the compression jaw transverse direction $Q_B$. If a respective movable compression jaw segment 26, 28 is displaced in the direction of movement B in the direction away from the fixed compression jaw segment 22 to the maximum extent, a plane defined by a support surface 50 can be displaced laterally to a plane defined by the compressing device longitudinal axis $L_V$ and a radial line at right angles thereto, but be essentially parallel thereto.

When a compressing process is being carried out, the compression jaw assembly units 12 of the compressing device 10, which can be seen in FIG. 1, are at first displaced radially outwards, for example, to such an extent that the movable compression jaw segments 26, 28 of compression jaw assembly units 12, which are adjacent about the compressing device longitudinal axis $L_V$ in the circumferential direction, do not touch one another and have each the maximum spacing from the associated fixed compression jaw segment 22. In this state of the compression jaw assembly units 12, a tubular metal part to be compressed, for example, a tubular housing made of sheet metal material, can then be inserted into the interior space enclosed by the compression jaws 16 of the compression jaw assembly units 12 and be held in a defined manner by means of corresponding holding tools. The compression jaw assembly units 12 are subsequently moved radially inwards, and circumferential spacings present between the movable assembly jaw segments 26, 28 of compression jaw assembly units 12, which are adjacent to one another, decrease at first in the course of this movement until the movable compression jaw segments 26, 28 of compression jaw assembly units 12, which are adjacent in the circumferential direction, come into contact with one another with their support surfaces 50. A continuing radial displacement of the compression jaw assembly units 12 then leads to the movable compression jaw segments 26, 28 of adjacent compression jaw assembly units 12, which movable compression jaw segments 26, 28 are supported on one another in the circumferential direction, acting on one another for movement toward the fixed compression jaw segment 22 associated with each of them in the circumferential direction. The result is that in case of continued displacement of the compression jaw assembly units 12 radially inwards, the circumferential spacings that are present at first between the movable compression jaw segments 26, 28 and each associated fixed compression jaw segment 22 of the compression jaws 16 or spacings in the direction of the compression jaw transverse direction $Q_B$ decrease as well. This radial displacement of the compression jaw assembly units 12 is continued until these compression jaw assembly units assume a positioning corresponding to the desired reduction of the dimension of the metal part to be compressed. In this state, spacings between the movable compression jaw segments 26, 28 and the fixed compression jaw segments 22 of the respective compression jaws 16, which fixed compression jaw segments 22 are each associated with these movable compression jaw segments 26, 28, may also be present in the direction of movement B or in the compression jaw transverse direction $Q_B$.

With the above-described configuration of a compression jaw assembly unit and of a compressing device comprising a plurality of such compression jaw assembly units, the circumferential spacing, present in a starting state before carrying out the radial displacement inwards or needed to make the radial displacement possible, is split into a plurality of partial circumferential spacings formed between individual compression jaws, on the one hand, and between compression jaw segments of the individual compression jaws, on the other hand. Each of these partial circumferential spacings may have comparatively small dimensions, so that no longer circumferential sections of a tubular metal part to be compressed, in which circumferential sections this tubular metal part is not supported radially outwards or is not acted on radially outwards, are present distributed over the circumference. The risk that yielding movements of a metal part to be compressed occur in case of such a compressing process, which may lead to undesired states of deformation, can thus be ruled out for the most part.

Finally, it should be pointed out that many different variations are possible in case of the above-described configuration. For example, a plurality of movable compression jaw segments following one another may thus be provided in case of the individual compression jaws on both sides of a respective fixed compression jaw segment. For example, two movable compression jaw segments may each be provided on both sides of a respective fixed compression jaw segment, wherein the movable compression jaw segment following the fixed compression jaw segment is supported on the fixed compression jaw segment via a prestressing device and is prestressed away from same, and an additional prestressing device acts between the two movable compression jaw segments, which prestressing device prestresses these movable compression jaw segments in the direction away from one another. The guiding of a plurality of such movable compression jaw segments following one another can be achieved by a guide formation, as was described above with reference to FIG. 2. Such a guide formation guiding a movable compression jaw segment or a plurality of movable compression jaws could also have a different number of guide elements. For example, three guide elements could be provided following one another, for example, in the direction of the compression jaw longitudinal direction. The guide elements and thus also the guide openings receiving these guide elements could also be offset in relation to one another essentially at right angles to a plane defined by the compression jaw longitudinal direction and the compression jaw transverse direction, i.e., essentially in a compression jaw radial direction.

It is also apparent that compression jaws, in which the respective compressing surfaces provided on them have curvatures different from one another, may also be used in a compressing device shown in FIG. 1 as a function of the outer circumferential geometry of a metal part to be compressed. For example, compression jaw segments with correspondingly smaller radius of curvature of the respective compressing surface could be used when a tubular metal part with an essentially elliptical cross-sectional geometry is processed, where this metal part has a smaller radius of curvature. Where such a tubular metal part has a greater radius of curvature, compression jaw segments with a correspondingly greater radius of curvature of the compressing surface provided thereon may be used. The curved structure of the compressing surfaces may also be provided, for example, by compressing surface segments provided at the compression jaw segments of a respective compression jaw not being curved, but being bent at an angle in relation to one another, so that a curved structure is approximated by a polygon-like structure.

While specific embodiments of the invention have been shown and described in detail to illustrate the application of the principles of the invention, it will be understood that the invention may be embodied otherwise without departing from such principles.

What is claimed is:

1. A compression jaw assembly unit for a compressing device for compressing tubular metal parts, the compression jaw assembly unit comprising:
   a compression jaw carrier; and
   a compression jaw provided at the compression jaw carrier, the compression jaw having a compressing surface oriented essentially facing away from the compression jaw carrier that is curved transversely to a compression jaw longitudinal direction in a compression jaw transverse direction, the compression jaw comprising a fixed compression jaw segment, which is fixed to the compression jaw carrier and provides a fixed compressing surface segment, and at least one movable compression jaw segment providing at least one moveable compressing surface segment, wherein the at least one movable compressing surface segment is moveable in a direction of movement corresponding to the compression jaw transverse direction in relation to the fixed compressing surface segment against a prestressing action of a prestressing device.

2. The compression jaw assembly unit in accordance with claim 1, wherein the at least one movable compression jaw segment follows the fixed compression jaw segment in the compression jaw transverse direction.

3. The compression jaw assembly unit in accordance with claim 1, wherein at least one movable compression jaw segment of the at least one movable compression jaw segment is arranged on one side of the fixed compression jaw segment in the compression jaw transverse direction and at least one other movable compression jaw segment of the at least one movable compression jaw segment is arranged on another side of the fixed compression jaw segment in the compression jaw transverse direction.

4. The compression jaw assembly unit in accordance with claim 1, wherein the at least one movable compression jaw segment is prestressed by the prestressing device in a direction of movement away from the fixed compression jaw segment.

5. The compression jaw assembly unit in accordance with claim 1, wherein associated with the at least one movable compression jaw segment the prestressing device comprises a prestressing element acting on the at least one movable compression jaw segment in a direction away from the fixed compression jaw segment.

6. The compression jaw assembly unit in accordance with claim 5, wherein:
   at least one movable compression jaw segment of the at least one movable compression jaw segment arranged on one side of the fixed compression jaw segment provides an adjacent movable compression jaw segment; and
   the prestressing element is supported at the fixed compression jaw segment and at the adjacent movable compression jaw segment and is arranged between the fixed compression jaw segment and the adjacent movable compression jaw segment.

7. The compression jaw assembly unit in accordance with claim 6, wherein:
   a prestressing element mounting recess is provided in at least one of the fixed compression jaw segment and the adjacent movable compression jaw segment; and
   the prestressing element mounting recess is elongated in the compression jaw longitudinal direction and partly receives the prestressing element which is supported at the fixed compression jaw segment and at the adjacent movable compression jaw segment.

8. The compression jaw assembly unit in accordance with claim 1, wherein:
- a compression jaw segment guide formation is associated with the at least one movable compression jaw segment; and
- the compression jaw segment guide formation guides the at least one movable compression jaw segment for movement in relation to the fixed compression jaw segment in the direction of movement.

9. The compression jaw assembly unit in accordance with claim 8, wherein the guide formation comprises:
- at least one guide element carried on the fixed compression jaw segment and extending essentially in the direction of movement and a guide opening movably receiving the at least one guide element in the direction of movement, in the at least one movable compression jaw segment associated with the guide element; or
- a support surface, which supports the at least one movable compression jaw segment on a rear side facing away from the compressing surface; or
- at least one guide element carried on the fixed compression jaw segment and extending essentially in the direction of movement and a guide opening movably receiving the at least one guide element in the direction of movement, in the at least one movable compression jaw segment associated with the at least one guide element and a support surface, which supports the at least one movable compression jaw segment on a rear side facing away from the compressing surface.

10. The compression jaw assembly unit in accordance with claim 9, wherein the guide formation comprises at least two guide elements of the at least one guide element, which are arranged at spaced locations from one another in at least one direction of the compression jaw longitudinal direction and a compression jaw radial direction at right angles to the compression jaw transverse direction and to the compression jaw longitudinal direction.

11. The compression jaw assembly unit in accordance with claim 1, wherein the compression jaw carrier comprises a carrier plate.

12. The compression jaw assembly unit in accordance with claim 1, wherein the compression jaw has an essentially mirror-symmetrical configuration in respect to the configuration of the compression jaw segments in relation to a compression jaw central plane, which is at right angles to the compression jaw transverse direction.

13. The compression jaw assembly unit in accordance with claim 1, wherein the compressing surface is not curved in the compression jaw longitudinal direction.

14. A compressing device for compressing tubular metal parts, the compressing device comprising a plurality of compression jaw assembly units arranged following one another about a compressing device longitudinal axis in a circumferential direction and moveable essentially radially in relation to the compressing device longitudinal axis, wherein each compression jaw assembly unit comprises:
- a compression jaw carrier; and
- a compression jaw provided at the compression jaw carrier, the compression jaw having a compressing surface oriented essentially facing away from the compression jaw carrier that is curved transversely to a compression jaw longitudinal direction in a compression jaw transverse direction, the compression jaw comprising a fixed compression jaw segment, which is fixed to the compression jaw carrier and provides a fixed compressing surface segment, and at least one movable compression jaw segment providing at least one moveable compressing surface segment, wherein the at least one movable compressing surface segment is moveable in a direction of movement corresponding to the compression jaw transverse direction in relation to the fixed compressing surface segment against a prestressing action of a prestressing device.

15. The compressing device in accordance with claim 14, wherein at least one movable compression jaw segment of the at least one movable compression jaw segment is arranged on one side of the fixed compression jaw segment in the compression jaw transverse direction and at least one other movable compression jaw segment of the at least one movable compression jaw segment is arranged on another side of the fixed compression jaw segment in the compression jaw transverse direction.

16. The compressing device in accordance with claim 14, wherein associated with the at least one movable compression jaw segment, the prestressing device comprises a prestressing element acting on the at least one movable compression jaw segment in the direction away from the fixed compression jaw segment.

17. The compressing device in accordance with claim 16, wherein:
- at least one movable compression jaw segment of the at least one movable compression jaw segment arranged on one side of the fixed compression jaw segment provides an adjacent movable compression jaw segment; and
- the prestressing element is supported at the fixed compression jaw segment and at the adjacent movable compression jaw segment and is arranged between the fixed compression jaw segment and the adjacent movable compression jaw segment.

18. The compressing device in accordance with claim 17, wherein:
- a prestressing element mounting recess is provided in at least one of the fixed compression jaw segment and the adjacent movable compression jaw segment; and
- the prestressing element mounting recess is elongated in the compression jaw longitudinal direction and partly receives the prestressing element which is supported at the fixed compression jaw segment and at the adjacent movable compression jaw segment.

19. The compressing device in accordance with claim 14, wherein:
- a compression jaw segment guide formation is associated with the movable compression jaw segment; and
- the compression jaw segment guide formation guides the at least one movable compression jaw segment for movement in relation to the fixed compression jaw segment in the direction of movement.

20. A compression jaw assembly unit for a compressing device for compressing tubular metal parts, the compression jaw assembly unit comprising:
- a compression jaw carrier; and
- a compression jaw provided at the compression jaw carrier, the compression jaw having a compressing surface oriented essentially facing away from the compression jaw carrier that is curved transversely to a compression jaw longitudinal direction in a compression jaw transverse direction, the compression jaw comprising a fixed compression jaw segment, which is fixed to the compression jaw carrier and provides a fixed compressing surface segment, and at least one movable compression jaw segment providing a moveable compressing surface segment, wherein the at least one movable compressing surface segment is moveable in a direction of movement in relation to the fixed compressing surface segment against a prestressing action of a prestressing device, wherein:

a compression jaw segment guide formation is associated with the at least one movable compression jaw segment; and the compression jaw segment guide formation guides the at least one movable compression jaw segment for movement in relation to the fixed compression jaw segment in the direction of movement, wherein the guide formation comprises:

at least one guide element carried on the fixed compression jaw segment and extending essentially in the direction of movement and a guide opening movably receiving the at least one guide element in the direction of movement, in the at least one movable compression jaw segment associated with the guide element; or a support surface, which supports the at least one movable compression jaw segment on a rear side facing away from the compressing surface; or at least one guide element carried on the fixed compression jaw segment and extending essentially in the direction of movement and a guide opening movably receiving the at least one guide element in the direction of movement, in the at least one movable compression jaw segment associated with the at least one guide element and a support surface, which supports the at least one movable compression jaw segment on a rear side facing away from the compressing surface;

wherein the guide formation comprises at least two guide elements of the at least one guide element;

wherein:

the at least two guide elements are arranged at spaced locations from one another in the compression jaw longitudinal direction; or the at least two guide elements are arranged at spaced locations from one another in a compression jaw radial direction at right angles to the compression jaw transverse direction and to the compression jaw longitudinal direction; or the at least two guide elements are arranged at spaced locations from one another in the compression jaw longitudinal direction and in the compression jaw radial direction.

* * * * *